C. BUBERL.
APPARATUS FOR INDICATING POROSITY.
APPLICATION FILED MAY 21, 1921.
1,421,903.
Patented July 4, 1922.
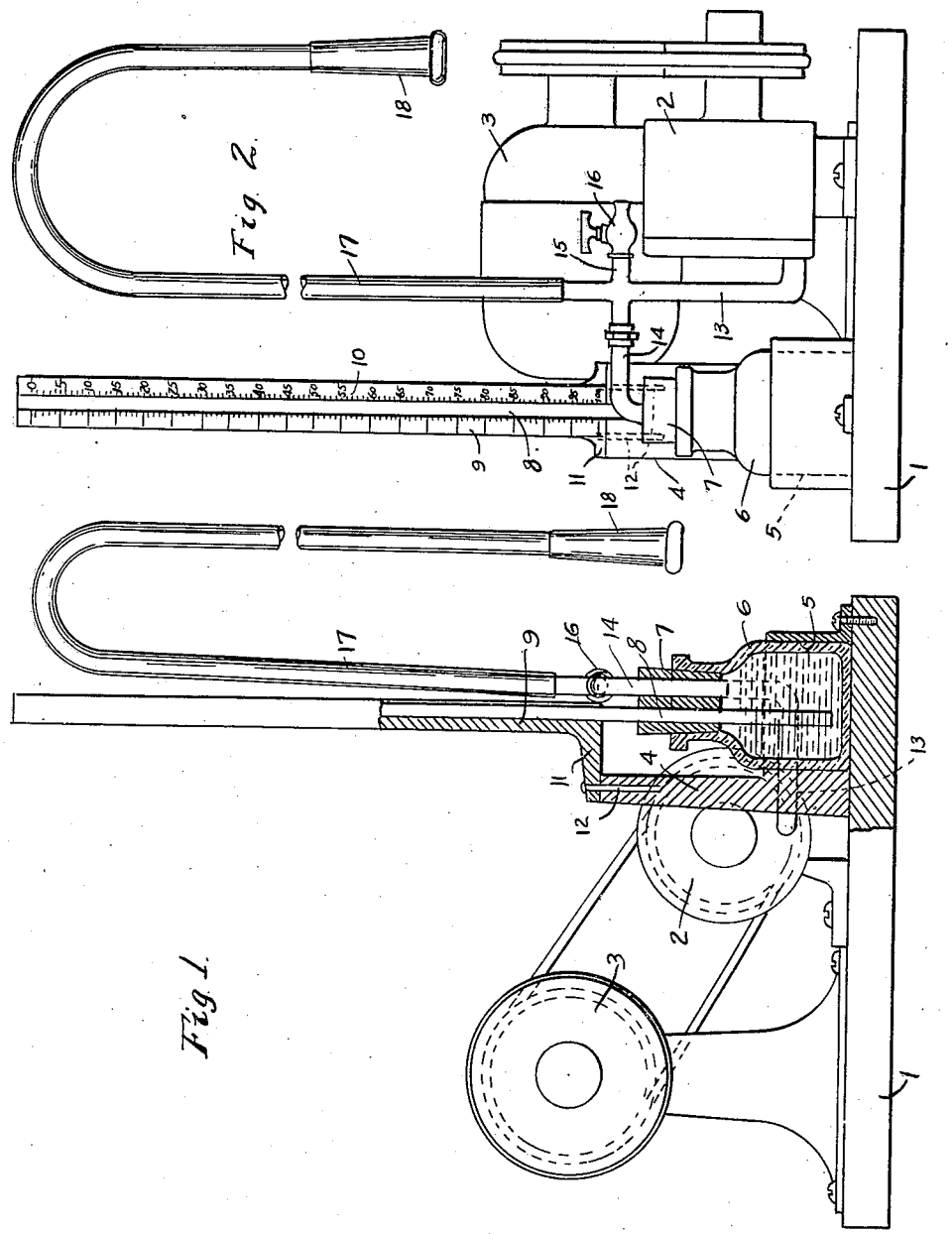
Inventor
Carl Buberl
By B. F. Wheeler
Attorney

UNITED STATES PATENT OFFICE.

CARL BUBERL, OF DETROIT, MICHIGAN.

APPARATUS FOR INDICATING POROSITY 1,421,903. Specification of Letters Patent. Patented July 4, 1922.

Application filed May 21, 1921. Serial No. 471,376.

*To all whom it may concern:*

Be it known that I, CARL BUBERL, a citizen of Austria, residing at Detroit, in the county of Wayne and State of Michigan, have invented a new and useful Apparatus for Indicating Porosity, of which the following is a specification.

This invention relates to indicating devices and more particularly to a method and apparatus for indicating the porosity of sand molds and cores for castings. It is the object of the invention to provide a pneumatic device, especially applicable to foundry use, for quickly and accurately indicating the porosities of sand molds and cores so that the molder or core-maker may have definite information as to when the sand has been tamped, or otherwise compressed to the density most suitable for the particular core or mold to be formed.

In attaining this object the invention contemplates portably mounting upon a suitable base a unit consisting of air compressing means, such as a small motor-driven blower, a liquid container connected to the pressure side of the blower, a valve controlling an air vent and regulating the maximum air pressure used in a testing operation, an indicating tube immersed at its lower end in the liquid in said container, a scale board adjacent to which said indicating tube rises, and a flexible tube communicating at one end with said container above the liquid level therein and provided at its other end with a rubber mouthpiece adapted to be pressed against a surface of the sand mold or core to be tested, the venting of the container through said flexible tube being determined by the porosity of the mold or core, and the rise of the liquid in the indicating tube being determined by the venting of said container through said tube.

A preferred embodiment of the invention is hereinafter described and is illustrated in the accompanying drawing wherein, Fig. 1 is a view in side elevation and partial section of the indicating apparatus.

Fig. 2 is a front view of the same.

In these views the reference character 1 designates a base plate upon which are secured a small blower 2, a motor 3 driving said blower, and a standard 4 having its lower portion apertured as indicated at 5 to form a holder for a container as a bottle 6. Said bottle, which is partially filled with ink or other colored liquid, is provided with a tight-fitting stopper 7, formed preferably of rubber, through which is passed a glass indicating tube 8 immersed at its lower end in the liquid contents of said bottle and extending upwardly a considerable distance above the base 1, the upper end of said tube being open. Closely adjacent said tube there is vertically extended a metering stick or bar 9, carrying a scale 10 for measuring the rise of liquid in said tube, the scale shown being graduated downwardly from zero to one hundred. It is preferred to detachably mount the bar 9 upon the standard 4, and this may be accomplished by forming a foot 11 upon said bar for seating upon the standard and carrying a pair of downwardly projecting pins 12 adapted to snugly engage in suitable sockets bored in the standard. Such a mounting permits the bar 9 to be removed, if desired, when the apparatus is not in use.

The blower 2 exhausts into a pipe 13 from which branches a pipe 14 opening at one end within the upper portion of the bottle 6 after being extended through the stopper 7 of said bottle. There is further branched from the pipe 13 a short vent pipe 15 controlled by a suitable stop-cock 16. To the end of said pipe 13 there is connected one end of a section of flexible tubing 17, provided at its other end with a rubber mouth piece or applicator 18, which may be held against the mold or core to be tested so as to permit an escape of air from said mouth-piece only through the body of the mold or core.

In the use of the described apparatus, the first step in the operation of testing a mold or core, after starting the motor 3, is to adjust the stop-cock 16 to insure a rise of the liquid to the top of the scale 10, or to the zero mark of said scale, when the mouthpiece 18 is applied to a non-porous body. In making this adjustment the applicator may be firmly squeezed so as to completely close its orifice or may be pressed against some substance of high density. Having thus insured an accurate zero reading, the mouth of the applicator is applied to the surface of the mold or core to be tested, causing resistance to the escape of air and a consequent rise of air pressure in the bottle 6 inversely proportionate to the porosity of the body being tested. Thus if the porosity of the tested body is low the rise of liquid in the tube 9 will be high, while a body of high porosity will allow a considerable escape of air from the tube 17, lowering the pressure in the bottle 6, and correspondingly limiting the rise of the liquid in the indicating tube. The scale 10 permits the condition of porosity of a mold or core under test to be expressed in definite figures, for the purpose primarily of comparison with the condition of other molds or cores which may be intended for the production of similar castings.

What I claim is:

1. An apparatus for indicating porosity, comprising means for compressing air, a receiver for the compressed air, an indicator of the air pressure in said receiver, regulable means for venting said receiver, and a mouth-piece in communication with the receiver applicable to a body to be tested to afford an escape of air from the receiver proportionate to the porosity of the body being tested.

2. An apparatus for indicating porosity, comprising means for compressing air, a receiver for the compressed air, an indicator of the air pressure in said receiver, regulable means for venting said receiver, a flexible tube communicating at one end with said receiver, and a mouth-piece carried by the other end of said tube applicable to the surface of a body to be tested, affording an escape of air from said mouth-piece only through the pores of the engaged body.

3. An apparatus for indicating porosity, comprising means for compressing air, a receiver for the compressed air, an indicator of the air pressure in said receiver, regulable means for venting said receiver, and a compressible resilient mouth-piece in communication with the receiver applicable to a body to be tested to afford an escape of air from the receiver proportionate to the porosity of the body being tested.

4. An apparatus for indicating porosity, comprising a base, a blower and a motor driving the same mounted upon said base, a receiver for the air delivered from said blower, mounted upon said base, an indicator of the air pressure in said receiver, means for regulably venting said receiver, and a mouth-piece in communication with said receiver, applicable to a body to be tested to afford an escape of air from the receiver proportionate to the porosity of said body.

In testimony whereof I sign this specification.

CARL BUBERL.